(12) United States Patent
Johnson et al.

(10) Patent No.: US 9,176,669 B2
(45) Date of Patent: Nov. 3, 2015

(54) ADDRESS RESOURCE MAPPING IN A SHARED MEMORY COMPUTER SYSTEM

(71) Applicant: Silicon Graphics International Corp., Fremont, CA (US)

(72) Inventors: Brian Justin Johnson, Rosemount, MN (US); Michael John Habeck, Eagan, MN (US)

(73) Assignee: Silicon Graphics International Corp., Milpitas, CA (US)

( * ) Notice: Subject to any disclaimer, the term of this patent is extended or adjusted under 35 U.S.C. 154(b) by 203 days.

(21) Appl. No.: 13/833,956

(22) Filed: Mar. 15, 2013

(65) Prior Publication Data

US 2014/0281334 A1  Sep. 18, 2014

(51) Int. Cl.
G06F 3/06 (2006.01)
G06F 12/02 (2006.01)

(52) U.S. Cl.
CPC ............ *G06F 3/06* (2013.01); *G06F 12/0284* (2013.01)

(58) Field of Classification Search
None
See application file for complete search history.

(56) References Cited

U.S. PATENT DOCUMENTS

| | | | | |
|---|---|---|---|---|
| 5,898,883 | A * | 4/1999 | Fujii et al. | 712/28 |
| 6,240,501 | B1 * | 5/2001 | Hagersten | 711/202 |
| 6,412,002 | B1 * | 6/2002 | Denman et al. | 709/224 |
| 7,120,680 | B1 * | 10/2006 | Higgins et al. | 709/220 |
| 7,213,081 | B2 * | 5/2007 | Narasimhamurthy et al. | 710/2 |
| 2006/0129741 | A1 * | 6/2006 | Hillier et al. | 711/5 |
| 2010/0217949 | A1 * | 8/2010 | Schopp et al. | 711/173 |
| 2011/0167226 | A1 * | 7/2011 | Pong | 711/147 |
| 2011/0271290 | A1 * | 11/2011 | Bodin | 719/330 |

OTHER PUBLICATIONS

Microsoft. "The system memory that is reported in the System Information dialog box in Windows Vista is less than you expect if 4 GB of RAM is installed". Article 929,605. Published Feb. 8, 2012.*
Leng, Ryan J. "The Secrets of PC Memory: Part 1". BitTech. Published on Nov. 15, 2007. <http://www.bit-tech.net/hardware/memory/2007/11/15/the_secrets_of_pc_memory_part_1/9>.*
Kingsley-Hughes, Adrian. "Clearing up the 32/64-bit memory limit confusion". Published Dec. 4, 2008. <http://www.zdnet.com/article/clearing-up-the-3264-bit-memory-limit-confusion/>.*
No_cluez. "Why is GPU emulation so demanding?". Published Feb. 23, 2012. <https://nocluez.wordpress.com/2012/02/23/technical-background-of-graphics-card-requirements-part-1-how-to-emulate-a-gpu/>.*
Fitzpatrick, Jason. "HTG Explains: What's the Difference Between 32-bit and 64-bit Windows?". Published Mar. 22, 2011. <http://www.howtogeek.com/56701/htg-explains-whats-the-difference-between-32-bit-and-64-bit-windows-7/>.*

* cited by examiner

*Primary Examiner* — Charles Rones
*Assistant Examiner* — Hewy Li
(74) *Attorney, Agent, or Firm* — Sunstein Kann Murphy & Timbers LLP

(57) ABSTRACT

An algorithm for mapping memory and a method for using a high performance computing ("HPC") system are disclosed. The algorithm takes into account the number of physical nodes in the HPC system, and the amount of memory in each node. Some of the nodes in the HPC system also include input/output ("I/O") devices like graphics cards and non-volatile storage interfaces that have on-board memory; the algorithm also accounts for the number of such nodes and the amount of I/O memory they each contain. The algorithm maximizes certain parameters in priority order, including the number of mapped nodes, the number of mapped I/O nodes, the amount of mapped I/O memory, and the total amount of mapped memory.

21 Claims, 11 Drawing Sheets

ID
ADDRESS RESOURCE MAPPING IN A SHARED MEMORY COMPUTER SYSTEM

FIELD OF THE INVENTION

The invention generally relates to computer memory and, more particularly, the invention relates to automatically configuring memory in a non-uniform memory access (NUMA) computing system having computing nodes based on the size and type of memory in each such node.

BACKGROUND OF THE INVENTION

Much like houses are given street addresses, each location in a computer's memory where data may be stored is given a memory address. And just like a traveler can locate a friend's house by using a street address, a computer processor is able to access specific memory by using its memory address. Each memory address is a different pattern of bits; that is, ones or zeros. The number of bits used in a memory address is always the same for a given processor. For example, one commonly used central processing unit ("CPU") microarchitecture includes 44 address bits, and so is able to address up to $2^{44}$ bytes, or 16 terabytes ("TB") of memory; that is, approximately 17.59 trillion different bytes. Similarly, another common CPU design includes 46 physical address bits, and so is able to address up to $2^{46}$ bytes, or 64 TB of memory; that is, about 70.37 trillion byes. Because the number of address bits is fixed in the processor design, a computer processor is only able to address a finite maximum memory address space.

As technology has improved, high performance computing ("HPC") systems have been developed, and over time these systems have increased their processing capacities. HPC systems include a number of modular computing nodes that have processors and memory. In some cases, the total memory of the system is more memory than can be addressed by its processors. When this occurs, a choice must be made regarding which memory receive an address (and thereby be accessible), and which memory should not receive an address (and thereby be inaccessible). Most prior HPC systems have not often experienced this problem because most modern processors have a large number of addressing bits. However, for those systems that have reached the limits of the addressing capabilities of their installed processors, their system operators have had to make a manual choice of which memory to address. Implementing this choice often required a great deal of expertise and understanding of performance compromises and other tradeoffs that could or should be made between various components in the HPC system, and a great deal of manual trial and error to find the right balance of capabilities.

SUMMARY OF VARIOUS EMBODIMENTS

To solve these problems, an algorithm for mapping memory and a method for using an HPC system are disclosed. The algorithm takes into account the number of physical nodes in the HPC system, and the amount of memory in each node. Some of the nodes in the HPC system also include input/output ("I/O") devices like graphics cards and non-volatile storage devices that have on-board memory; the algorithm also accounts for the number of such nodes and the amount of I/O memory they each contain. The algorithm maximizes certain parameters in priority order, including the number of mapped nodes, the number of mapped I/O nodes, the amount of mapped I/O memory, and the total amount of mapped memory.

A computer system embodiment having hardware-based non-uniform memory access is disclosed. The computer system has a plurality of nodes, each node having a volatile memory and at least one computing processor. At least one node also includes an I/O device having I/O memory. Each node is configured to calculate a memory layout that includes a portion of the volatile memory of each of a plurality of nodes in the computer system. The memory layout is calculated as a function of 1) the number of nodes in the computer system, 2) the amount of volatile memory in each node, 3) the number of nodes that include an I/O device having I/O memory, and 4) the amount of I/O memory in each such I/O device. The processor of each node is configured to access the memory of another node using the calculated memory layout.

Variations on this system are contemplated. Each computer processor may be capable of addressing a maximum amount of volatile memory, where the collective amount of volatile memory in the plurality of nodes is greater than the maximum amount. The maximum amount of volatile memory may be at least 16 terabytes. The I/O device may be a network card, a graphics card, a non-volatile storage device, a coprocessor, or an accelerator card. Calculating the memory layout may include minimizing the number of unmapped nodes, minimizing the number of unmapped nodes that include an I/O device, maximizing the amount of mapped I/O memory, and maximizing the amount of mapped volatile memory.

There is also disclosed a method of operating such a computer system. The method may be varied in the same way as described above. There is also disclosed a computer program product for operating such a computer system, the computer program product being a computer-readable medium on which is stored non-transitory program code. The program code may be varied in the same way as just described.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an algorithm for mapping memory and a method for using a high performance computing ("HPC") system are used. The algorithm takes into account the number of physical nodes in the HPC system, and the amount of memory in each node. Some of the nodes in the HPC system also include input/output ("I/O") devices like graphics cards and non-volatile storage devices that have on-board memory; the algorithm also accounts for the number of such nodes and the amount of I/O memory they each contain. The algorithm maximizes certain parameters in priority order, including the number of mapped nodes, the number of mapped I/O nodes, the amount of mapped I/O memory, and the total amount of mapped memory. Details of illustrative embodiments are discussed below.

System Architecture

Figure 1:
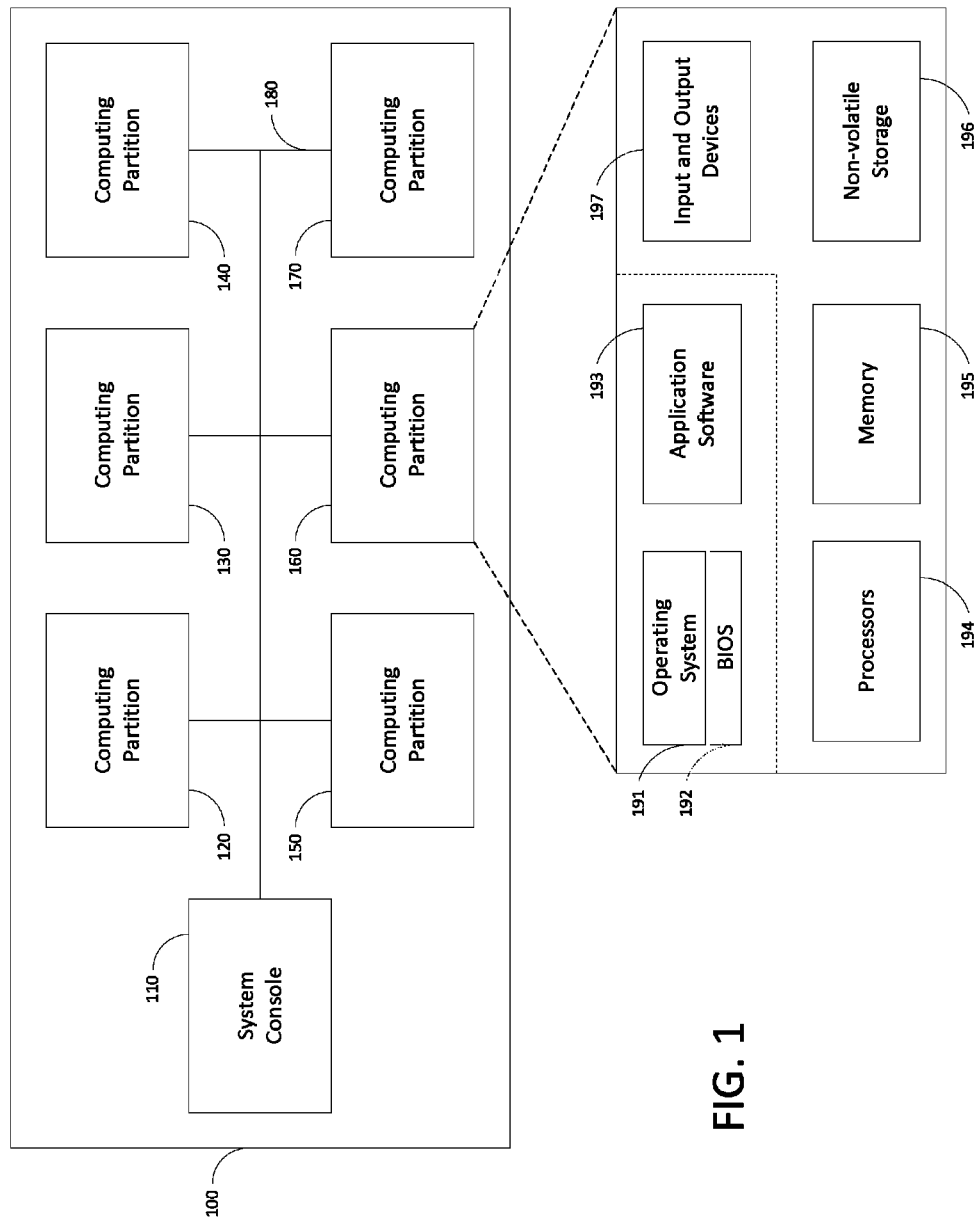
FIG. 1 schematically shows a logical view of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors, coprocessors, or accelerators 194, volatile memory 195, non-volatile storage 196 (e.g. a hard disk drive), and other input and output ("I/O") devices 197 (e.g., network cards, graphics cards, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
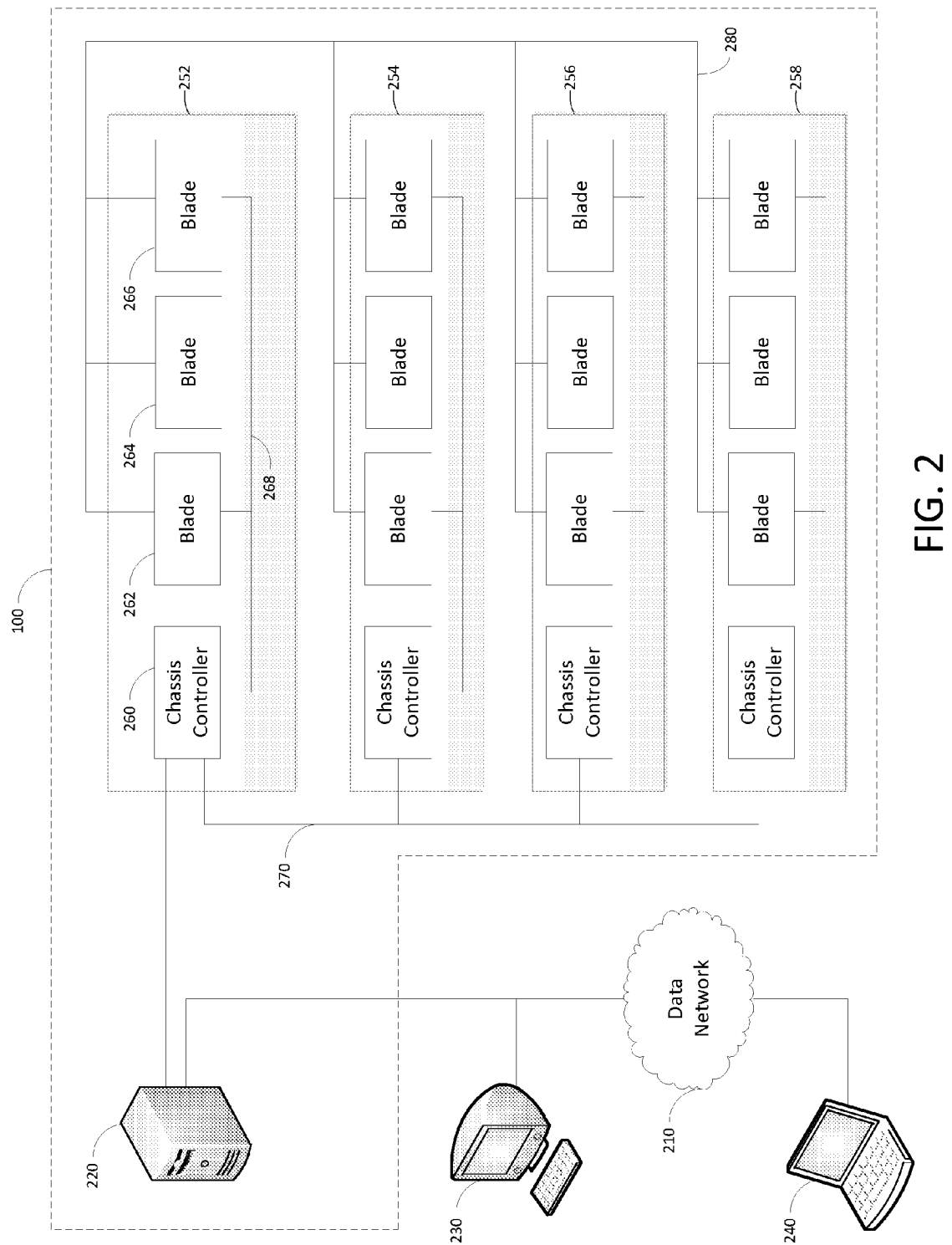
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to an enterprise data network 210 to facilitate user access.

The HPC system 100 includes a system management node ("SMN") 220 that performs the functions of the system console 110. The management node 220 may be implemented as a desktop computer, a server computer, or other similar computing device, provided either by the enterprise or the HPC system designer, and includes software necessary to control the HPC system 100 (i.e., the system console software).

The HPC system 100 is accessible using the data network 210, which, may include any data network known in the art, such as an enterprise local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by an enterprise computer 230 by way of remote login using tools known in the art such as Windows® Remote Desktop Services or the Unix secure shell. If the enterprise is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or an enterprise computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
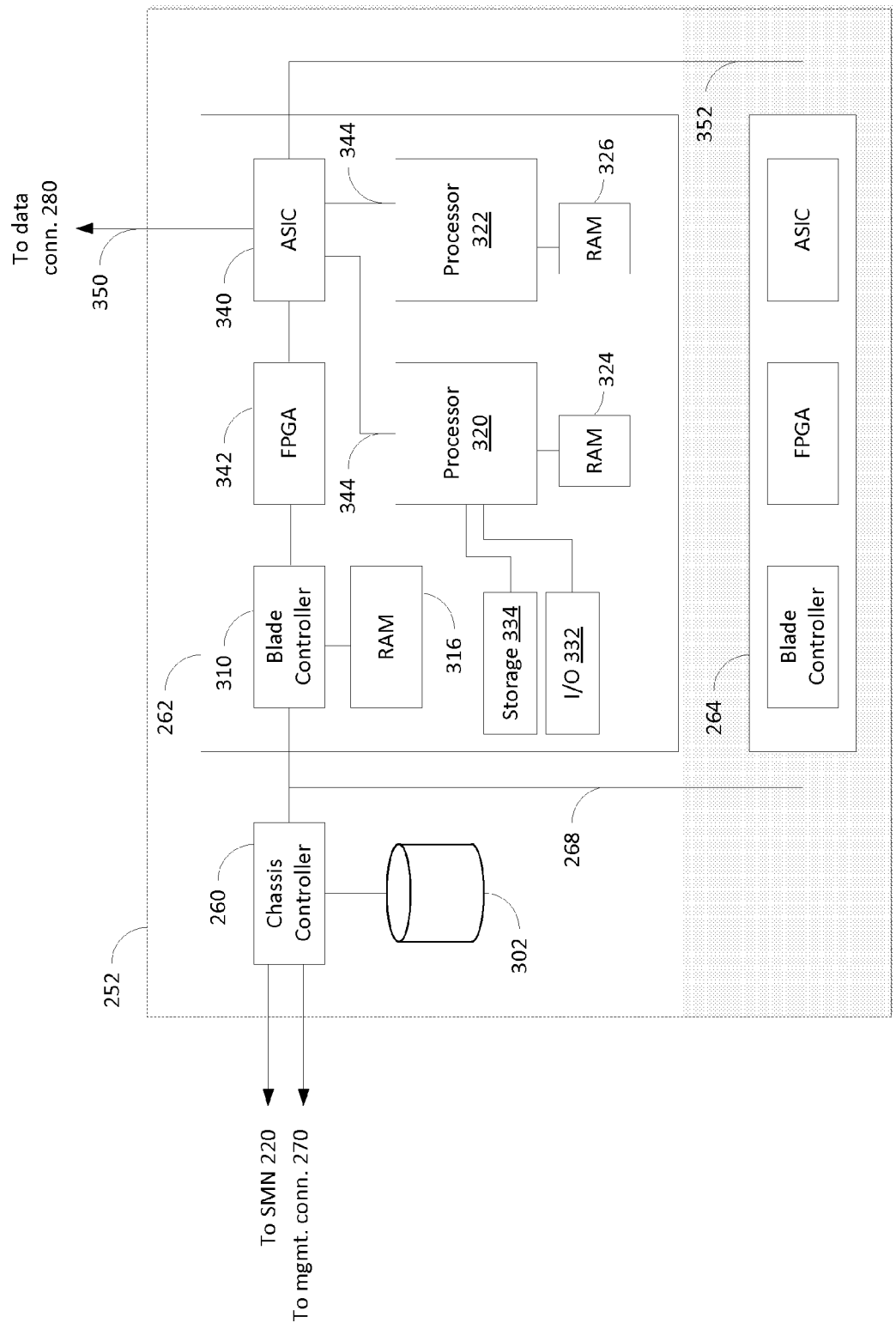
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICs that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, an enterprise may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Memory Layout

The design of the HPC system 100 permits the processors 320, 322 of the blade 262 to access not only the local RAM 324, 326 and the local I/O devices 332, but also remote RAM that is installed in other blades such as blade 264, and even remote non-RAM memory such as remote memory-mapped registers, remote memory-mapped I/O devices, and so on. Such systems are called non-uniform memory access ("NUMA") systems, because the time required to access a particular address in memory depends on where the memory is physically located.

In accordance with illustrative embodiments of the invention, each partition 160 in the HPC system 100 includes a single, global memory address space 195. That is, each processor in the partition is presented with the same physical memory map, and each mapped address corresponds to a physical location in memory. However, in NUMA systems, accessing each memory address may incur a different latency, unlike ordinary computing systems. The arrangement of memory in a NUMA system is thus very important.

While different nodes in a partition have different memory layouts, as described in more detail below, each node typically contributes some amount of RAM to its partition as a function of its installed memory chips. Each byte in the memory has a memory address that is a combination of some number of bits (ones or zeroes). For the remainder of the disclosure, define M as the number of bits required to address all RAM in the node having the largest amount of RAM. In a preferred embodiment, the value of M is used by all partitions of the HPC system 100, while in other embodiments the value of M may differ between partitions.

The number M is physically important, because each processor 320 includes a fixed number of physical address bits ("PA") that it uses to address memory. Each processor 320 may address only memory that has an address less than $2^{PA}$. For example, Intel® processors using the microarchitecture codenamed "Nehalem" include 44 physical address bits, so they are able to address up to $2^{44}$ bytes, or 16 terabytes ("TB") of memory; that is, approximately 17.59 trillion different bytes. Similarly, Intel® processors having the "Sandy Bridge" design include 46 physical address bits, so they are able to address up to $2^{46}$ bytes, or 64 TB of memory; that is, approximately 70.37 trillion byes. It is expected that as processors become more sophisticated, these numbers will increase; however, the size of PA does not affect the operation of various embodiments of the invention. While most regular computing systems do not closely approach these large numbers, embodiments of the present invention can. For example, an HPC partition that includes $2^9$=512 compute nodes each having $2^{35}$ bytes=32 GB of RAM will have collectively $2^{44}$ bytes=16 TB of RAM.

Typically, one node in a partition is used to boot the operating system, as described above. This node is referred to as "Node 0". The memory layout of Node 0 is special because it includes resources used to boot the partition, and these resources must be mapped at fixed locations in the address space of Node 0. Other nodes in the partition do not require special resources to permit the operating system to boot, so their respective address spaces may be used entirely for mapping RAM used for computation.

Figure 4:
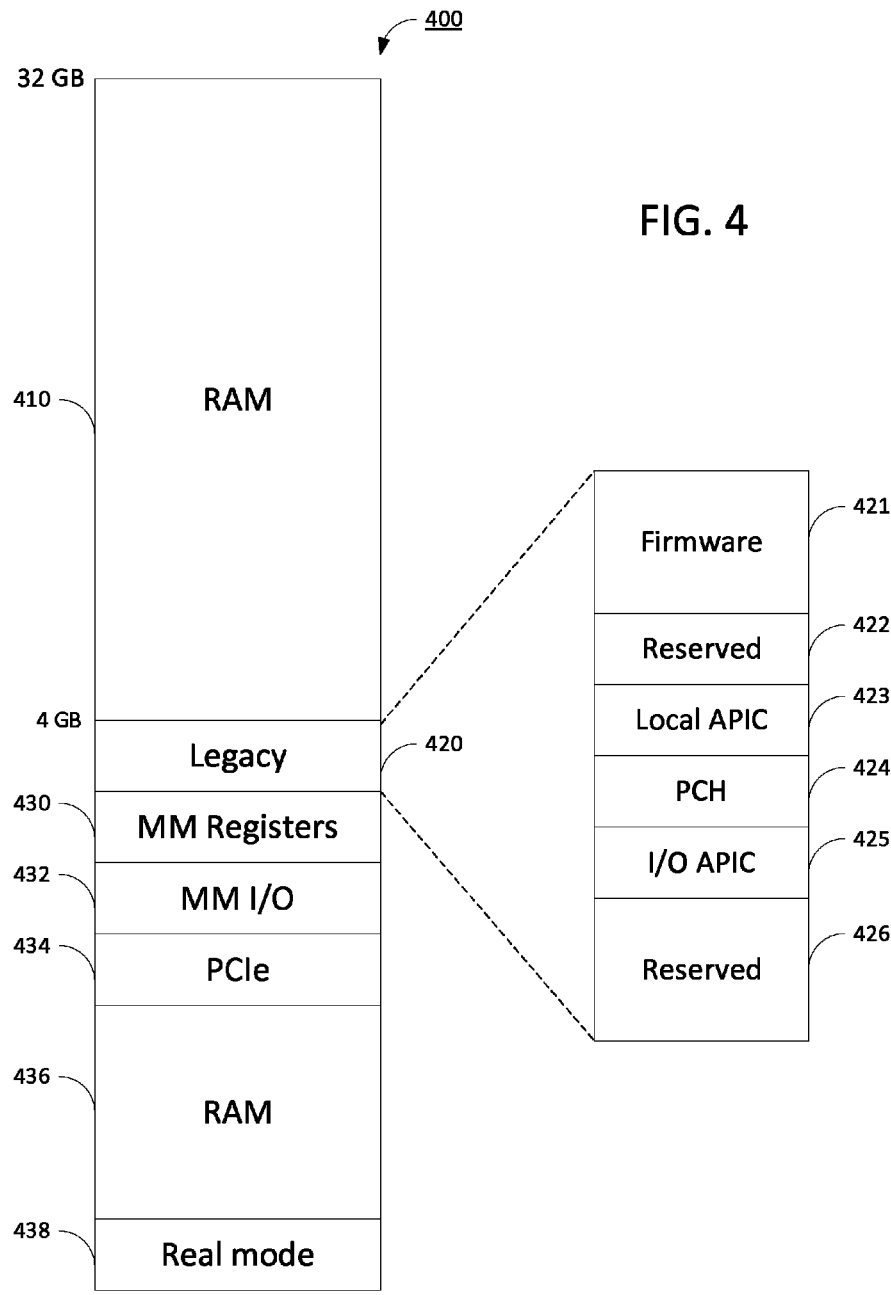
FIG. 4 schematically shows an exemplary memory layout for a boot node in the HPC system of FIG. 1.

FIG. 4 schematically shows a memory layout 400 for Node 0 in an HPC system embodiment of the invention that uses Intel® processors. For purposes of illustration, the node of FIG. 4 includes 32 gigabytes ("GB") of memory, so in this case M=35. Memory 410 having addresses greater than 4 GB may be used for computation. The first 4 GB of memory space 400 include data that are mapped at certain fixed memory addresses defined by the processor designer. These lower memory areas are now described.

For purposes of describing memory layout, memory addresses may be represented using hexadecimal (base-16) notation. According to this notation, numbers zero through nine are represented by their respective numerals 0-9, and numbers ten through fifteen are represented by the letters A-F respectively. Hexadecimal numbers are prefixed with "0x" to distinguish them from ordinary decimal numbers. For example, the hexadecimal number 0x123 equals the decimal number $1*16^2+2*16^1+3*16^0$=291. For ease of reading, large memory addresses are broken into groups of four hexadecimal numbers.

A legacy area 420 comprising 32 MB of memory between addresses 0xFE00 0000 and 0xFFFF FFFF has a great deal of legacy data, including: 16 MB of firmware 421, 1 MB of reserved space 422, 1 MB of memory 423 for an advanced programmable interrupt controller (APIC), 1 MB of memory 424 for a platform controller hub (PCH), 1 MB of memory 425 for an I/O APIC, and 12 MB of reserved space 426. The firmware area 421 beginning at 0xFF00 0000 may be used by the Intel® 82802 Firmware Hub, a discrete component that includes a random number generator, general purpose inputs, and other I/O features. In some systems, this area 421 might be used by flash memory connected directory to the PCH or to the FPGA 342 via the hub ASIC 340. The memory area 423 beginning at 0xFEE0 0000 is used by a processor-bound interrupt controller for routing interrupt signals to the processor. Likewise, the memory area 425 beginning at 0xFEC0 0000 is used for routing I/O-generated interrupts to the correct processor-bound APIC. The memory area 424 beginning at 0xFED0 0000 is used by the PCH to provide certain functions such as a high precision system clock (HPET).

Other memory areas are mapped below 4 GB. These include an area 430 for memory mapped registers, an area 432 for memory mapped I/O devices, an area 434 for PCI-Express devices, and a 1 MB area 438 for "real mode" memory management. The remainder 436 of the memory below the 4 GB limit can be used for computation. (Modern systems are able to remap this memory 436 to have an address higher than 32 GB in order to access more memory.) The area 430 may be used to provide direct memory access to control and status registers provided by a hub ASIC 340.

The memory area 432 is used to map memory contained within I/O devices. Many peripheral I/O devices such as network interfaces and hard disk interfaces include a certain amount of on-board memory; for example, the network interface or hard disk interface may have a buffer holding data to be read or written. The memory area 432 provides this on-board memory with address space in the node's memory map 400.

The memory area 434 is used to configure PCI-Express devices. This memory area 434 includes registers mapped from peripheral devices such as video cards, wired and wireless networking cards, computing coprocessors or accelerator cards, and others that implement the PCI-Express protocol. If several PCI-Express segments are present, several memory areas 434 will be mapped into the address space 400. These areas are typically 256 MB in size, but may be whatever size is required to accommodate the relevant device configuration spaces.

The memory area 438 is used for "real mode" memory access. When an Intel® processor is reset, it begins executing instructions in real mode. In real mode, only 20 address bits are used, so only the first 1 MB of memory is addressable (from address 0x0 to address 0xF FFFF). When operating in real mode, all software may access all memory addresses; there are no memory protections. Therefore, modern operating systems often come with boot loaders that place a small amount of boot code in this area 438, to initialize memory protections and prepare the processor 320 to execute the operating system proper.

Figure 5:
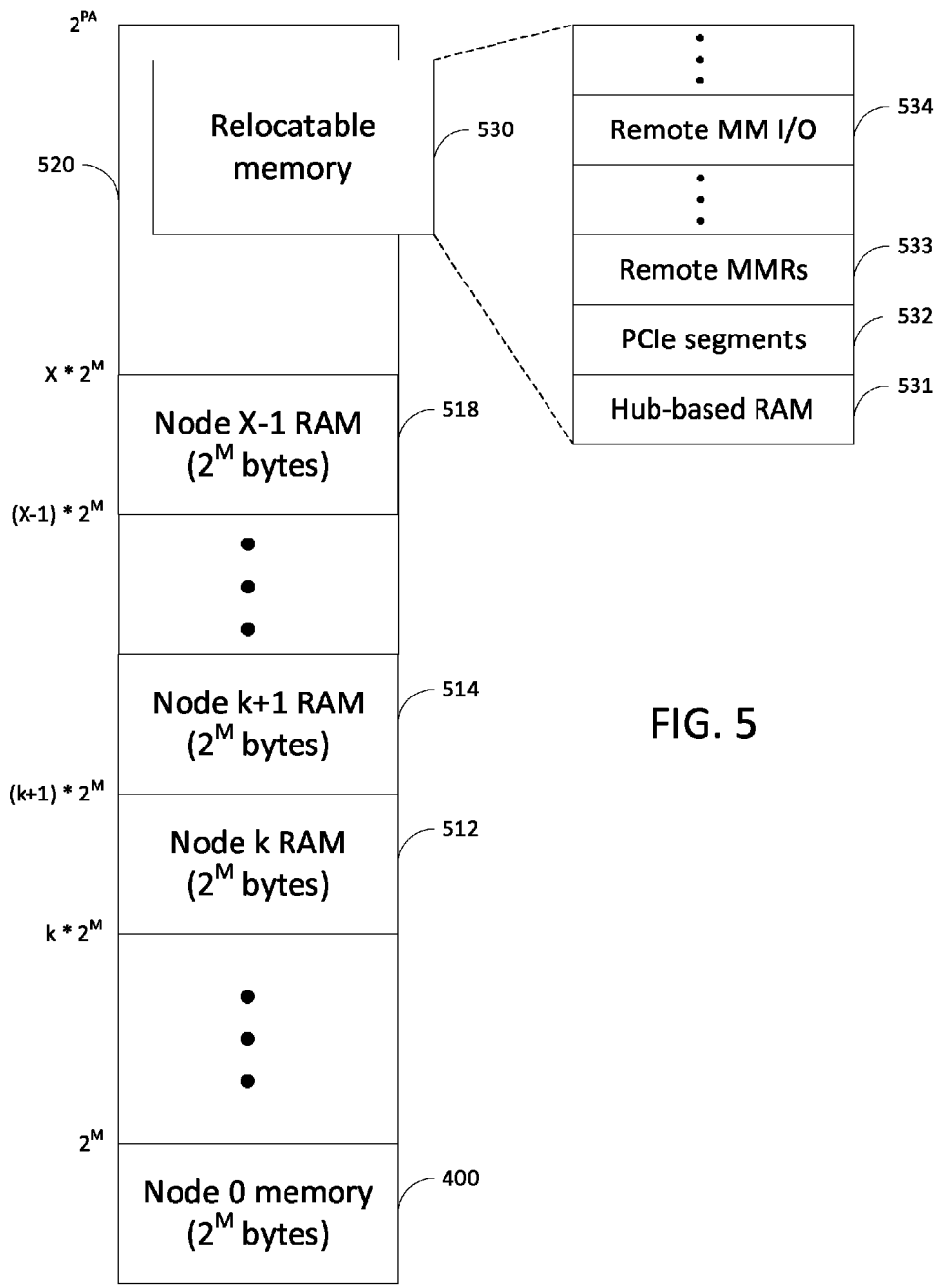
FIG. 5 schematically shows an exemplary global memory layout for the entire HPC system of FIG. 1.

Having described the memory layout of Node 0, the global memory layout for an entire partition is now described with reference to FIG. 5. For purposes of illustration, the partition has a number of nodes called "X", and nodes are numbered between 0 and X−1. For the rest of this disclosure, the number N will be used to mean the number of bits required to represent the number of nodes in a given partition. In other words, N=log 2(X), rounded up to the nearest integer. If each node in a partition provides $2^M$ bytes of RAM, then to completely address it will require $2^{M+N}$ physical address bits.

As noted above, nodes that are not used to boot the operating system may use all of their RAM for computation. Therefore, the global memory layout places the memory 400 of Node 0 from address 0 to address $2^M-1$, and places the RAM of the other nodes immediately thereafter in ascending order of node identifier. By way of illustration, a Node k has its RAM mapped 512 beginning at memory address $k*2^M$ as shown, for values of k between 0 and X−1. The memory of Nodes k+1 and X−1 are shown as boxes 514 and 518, respectively, along with their relevant memory addresses.

The memory area 520, extending from address $X*2^M$ to $2^{M+N}-1$, contains relocatable memory 530 that is mapped into the global address space. The size of this relocatable memory 530 is hereafter called R. Some types of relocatable memory were described above, and include memory for hub-based RAM 531, PCIe devices 532, memory mapped registers 533, and memory mapped I/O 534. Hub-based RAM 531 includes any other RAM used to provide NUMA functions to the HPC system 100. PCIe segment space 532 includes configuration registers for PCIe devices that are not enumerated via PCIe space 434. Memory area 533 includes space for memory mapped registers for remote nodes. Memory areas 531-533 include resources mapped from each node in the partition.

Memory area 534 includes space for directly mapping I/O devices that have up to 64 bits of address space. This includes many newer I/O devices, such as graphics cards. Because the number of I/O devices may vary per use case, the size of the relocatable memory 530 may vary. Therefore, the number of bits used specifically to address I/O nodes is important, and is hereafter called $N_{IO}$. Similarly, the number of bits required to address all data in the largest block of mapped I/O memory is hereafter called $M_{IO}$. The size of the relocatable memory 530 is then a function of N, $N_{IO}$ and $M_{IO}$.

Collectively, these memories 531-534 may be set by a system operator according to her preferences. For example, an HPC user designing an airplane or modeling fluid flow may decide that a large number of graphics cards are required, and install these in a number of I/O nodes (so $N_{IO}$ is large), or that a smaller number of graphics cards with a lot of on-board RAM would suffice (so $M_{IO}$ is large). But another user using a cryptographic application may not require these graphics cards ($N_{IO}$ and $M_{IO}$ are both small). Furthermore, one enterprise may purchase a lot of nodes (N is large), while another enterprise may have a smaller number of nodes. The size of the relocatable memory 530 varies from one use case to the next, and from one enterprise to the next, although it is typically configured at boot time and not changed between execution of software applications. Therefore, the relocatable memory 530 must be placed into the global memory map as a function of the given enterprise and application.

Dynamic Layout with Excess Memory

An HPC system 100 having many nodes that each contain a large amount of memory might actually exhaust the available memory space. That is, the size of the relocatable memory 530 plus the size of the installed RAM may exceed $2^{PA}$ bytes. When this occurs, not all memory in the system can be addressed, and a choice must be made regarding which memory should be mapped, and which memory should be inaccessible.

Prior HPC systems have not often experienced this problem because of the large number of addressing bits PA. However, for those systems that have reached the limits of the addressing capabilities of their installed processors, their system operators have had to make a manual choice of which memory to map. Implementing this choice often required a great deal of expertise and understanding of compromises and tradeoffs that could or should be made between various components. The process of configuring the system also required expertise in the use of the system console 110.

Because memory accesses must be fast, the HPC system 100 may determine what node a particular address is in based on a memory mask; that is, a processor 320 or hub ASIC 340 may apply a bitwise masking operation to a given address to determine which bits are ones and which are zeros, and therefore which node hosts that address. Therefore, these tradeoffs are made with respect to allocating more or fewer bits of memory address to nodes or to per-node memory.

In very large systems, there are essentially three parameters that may be adjusted to alter the memory layout: the number of nodes X in the system (or the number of bits N required to address these nodes); the number of bytes of RAM installed in each node (or the number of bits M required to address this RAM); and the amount of relocatable memory R, which is application-dependent and a function of N, $N_{IO}$, and $M_{IO}$. In what follows, various tradeoffs between the parameters M, N, $M_{IO}$, and $N_{IO}$ are discussed, and an algorithm is presented that dynamically chooses the best memory layout in order to minimize the amount of memory that is lost.

Figure 6:
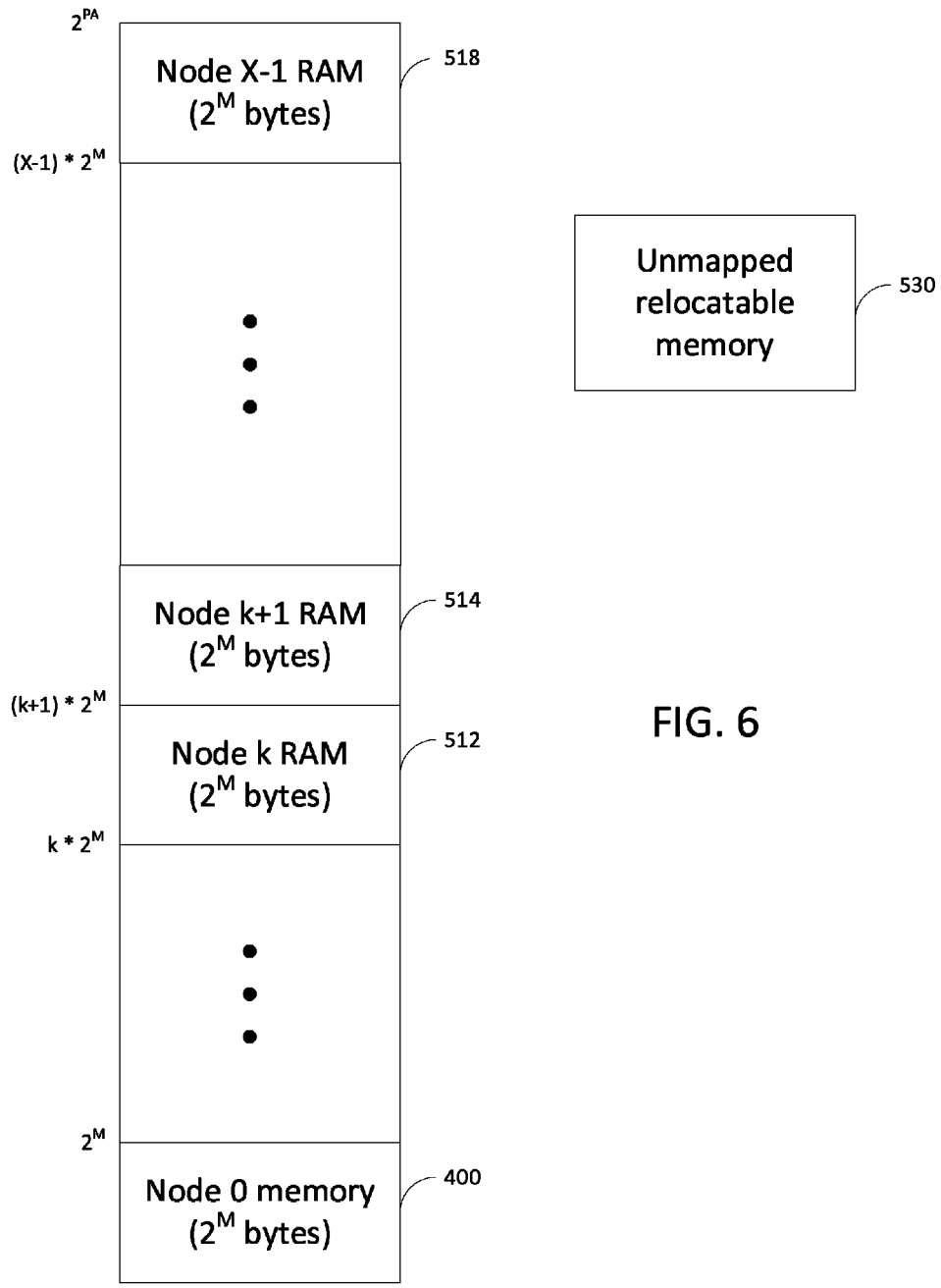
FIG. 6 shows a memory layout in which a partition of an HPC system cannot simultaneously map all of its RAM and all of its relocatable memory.

FIG. 6 shows a memory layout in which a partition of an HPC system cannot simultaneously map all of its RAM and all of its relocatable memory. In the HPC system of FIG. 6, a partition has been created in which PA=M+N; that is, the number of available address bits PA equals the number of bits M required to address all of the RAM in each node, plus the number of bits N required to address each node separately. FIG. 6 shows a naïve mapping in which all of the RAM has been mapped. In this case, there is no more space in the address space to map the R bytes of relocatable memory 530. As a result, remote MMR space 533 is inaccessible, for example, so the hub ASICs in each node will be unable to communicate with hub ASICs in other nodes and the system will fail to boot.

Figure 7A:
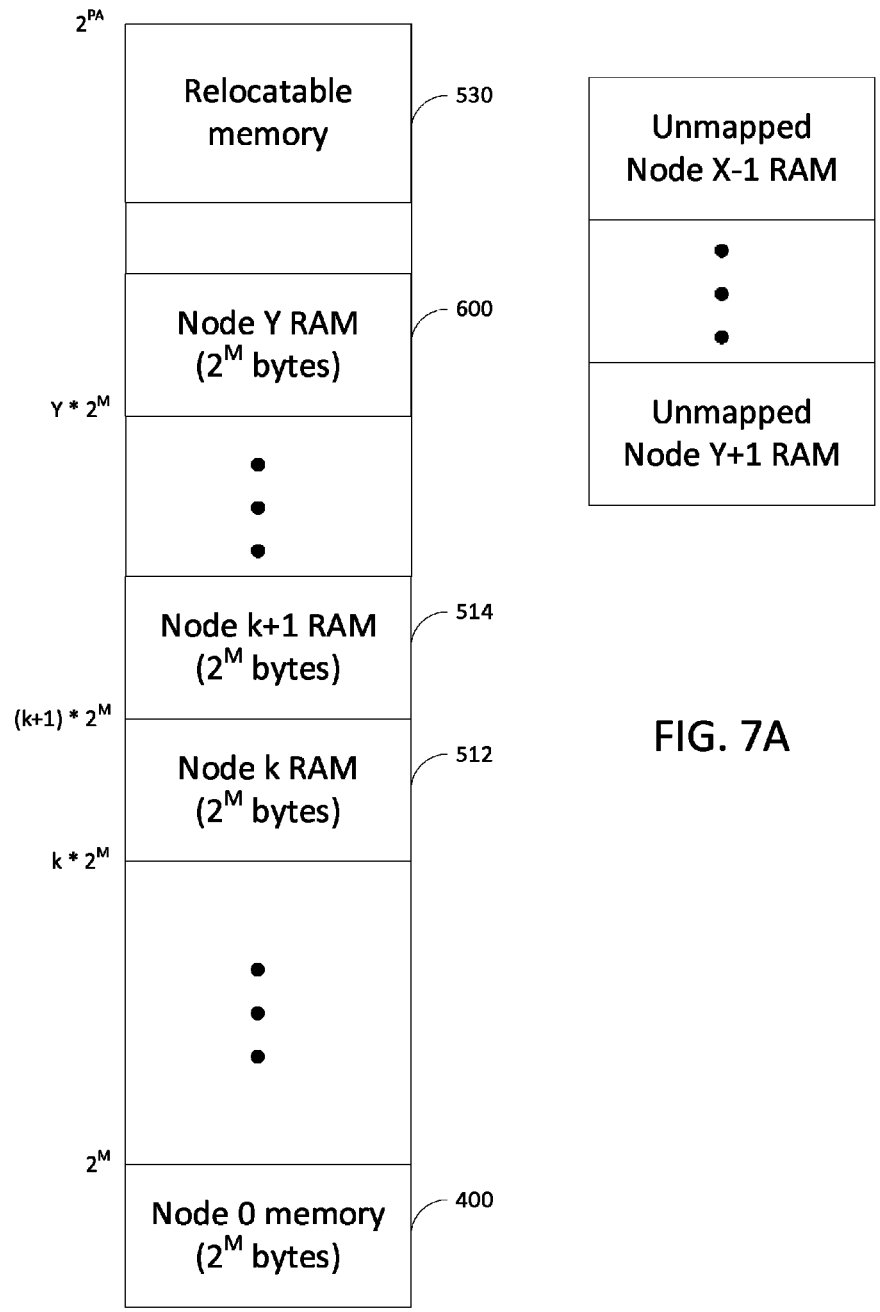
FIG. 7A shows the memory layout of FIG. 6, corrected according to a first embodiment of the invention by mapping all of the relocatable memory but reducing the number of nodes in the partition.

FIG. 7A shows the memory layout of FIG. 6, corrected according to a first embodiment of the invention by mapping all of the relocatable memory but reducing the number of nodes in the partition by reducing N. In FIG. 7A, some number of nodes at the top of the address space have been removed to permit the mapping of relocatable memory area 530, without reducing M or R. In particular, the highest mapped node ID is now $Y=2^{N-1}$, which is less than the previous maximum identifier X−1. The mapped RAM for Node Y is shown as block 600. Memory for nodes with higher IDs is now unmapped. This means that all of their resources are no longer accessible, and they can be removed from the partition with no adverse effect. However, this situation is undesirable when the HPC system 100 includes only one partition, because some of the nodes that an enterprise has purchased and installed in the system are no longer useful.

Figure 7B:
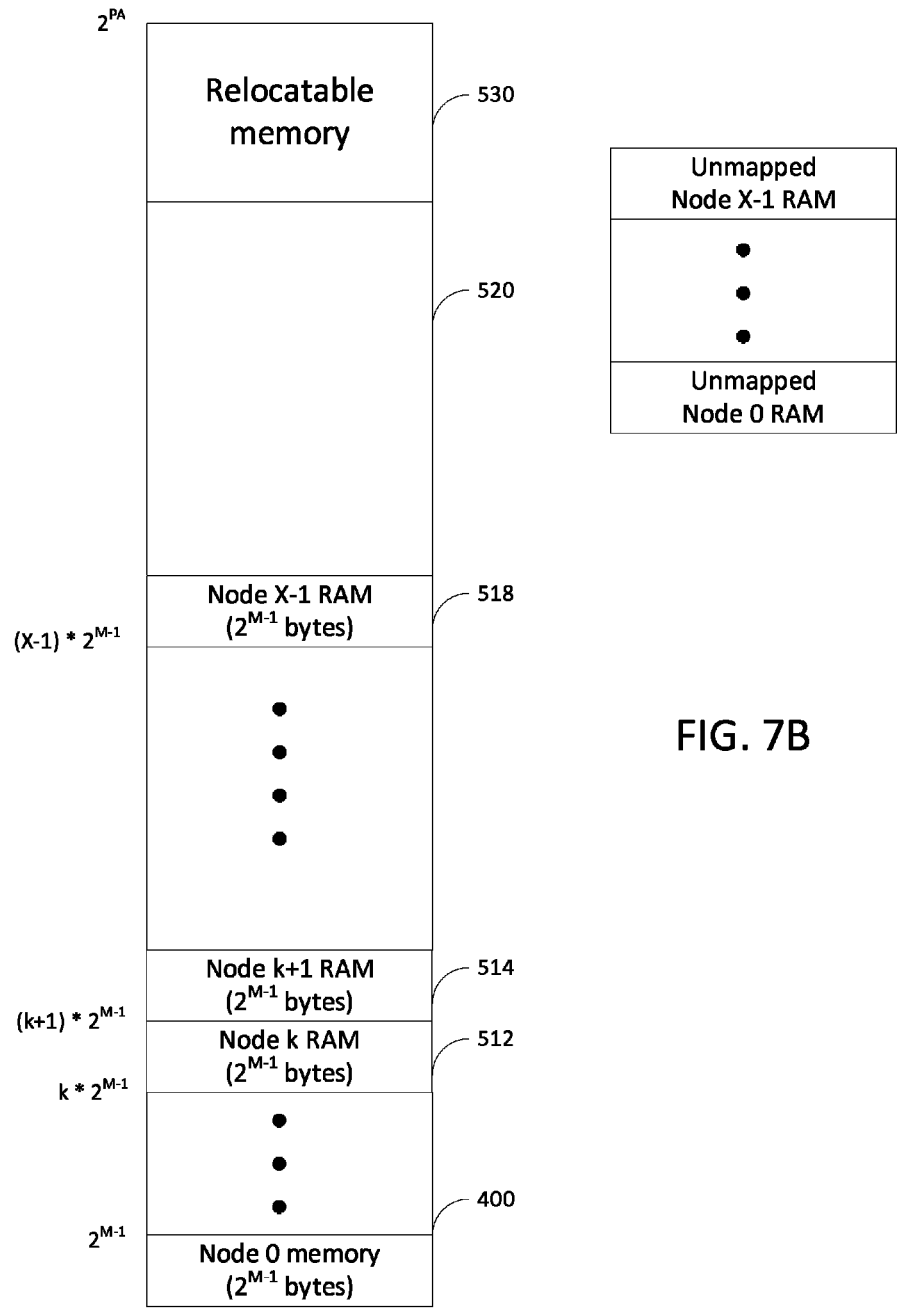
FIG. 7B shows the memory layout of FIG. 6, corrected according to a second embodiment of the invention by reducing the amount of mapped memory in each node of the partition.

FIG. 7B shows the memory layout of FIG. 6, corrected according to a second embodiment of the invention by reducing the amount of mapped memory in each node of the partition; that is, by reducing M. This reduction has the effect of halving the amount of usable memory in each node. This memory configuration permits all nodes and all relocatable memory to be mapped (assuming that R is less than or equal to $2^{M-1}$, which is generally true). However, half of the RAM in the system is now inaccessible. This situation is not ideal for an enterprise that has paid a great deal of money for RAM that is now going unused.

Figure 7C:
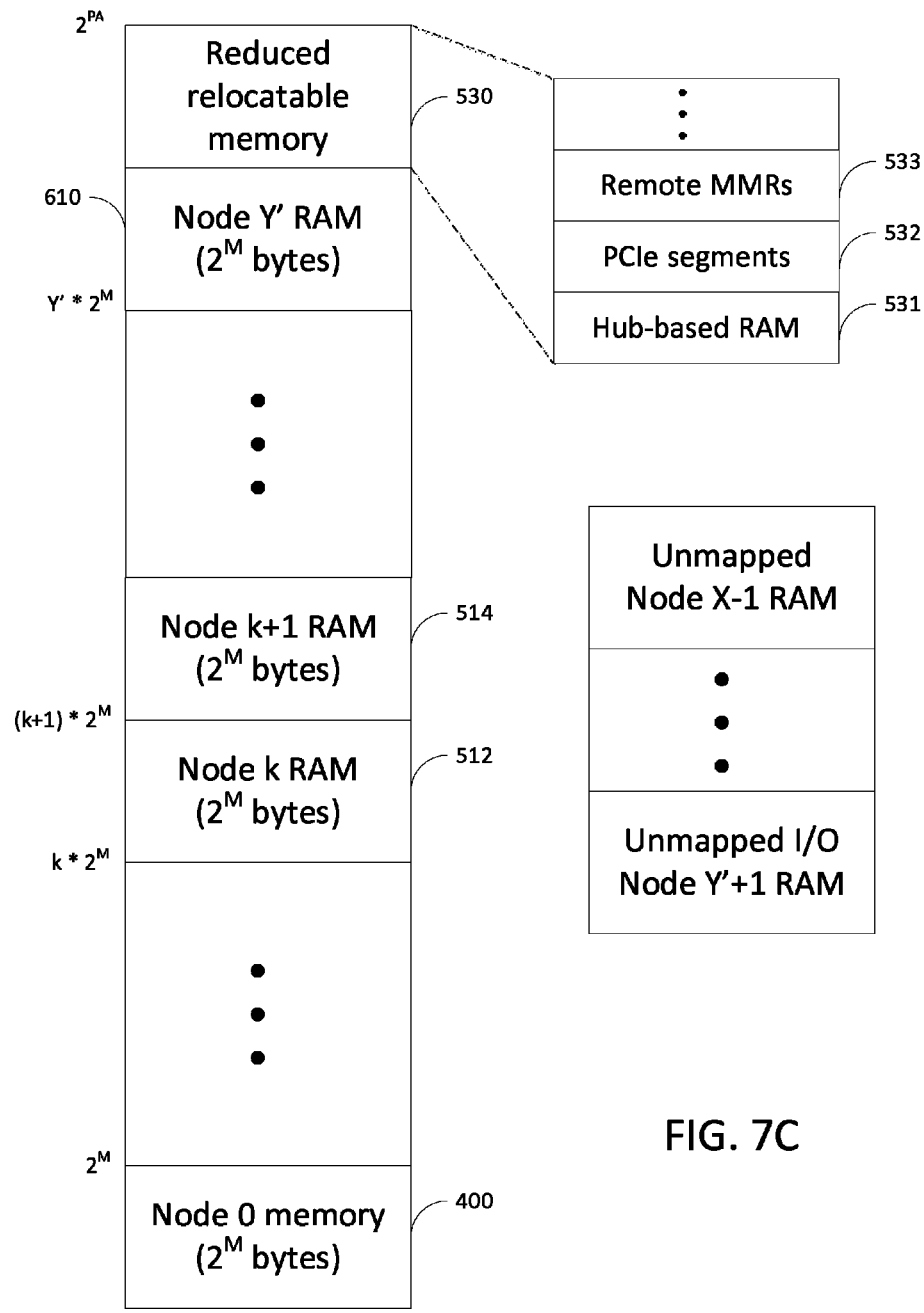
FIG. 7C shows the memory layout of FIG. 6, corrected according to a third embodiment of the invention by reducing the number of I/O nodes in the partition.

FIG. 7C shows the memory layout of FIG. 6, corrected according to a third embodiment of the invention by reducing the number of I/O nodes in the partition; that is, by reducing $N_{IO}$. In particular, the remote memory-mapped I/O area 534 of some or all of the I/O nodes has been eliminated. By reducing $N_{IO}$, R is likewise reduced, freeing up address space for other nodes to be mapped. The highest mapped node ID is now Y', which is greater than Y but still might be less than the previous maximum identifier X−1. The RAM for Node Y' is shown as block 610. In this situation, more nodes are addressable than in FIG. 7A, and the system will boot. However, some I/O nodes are no longer addressable, which means that all of the I/O functionality of these nodes is undesirably lost.

Figure 7D:
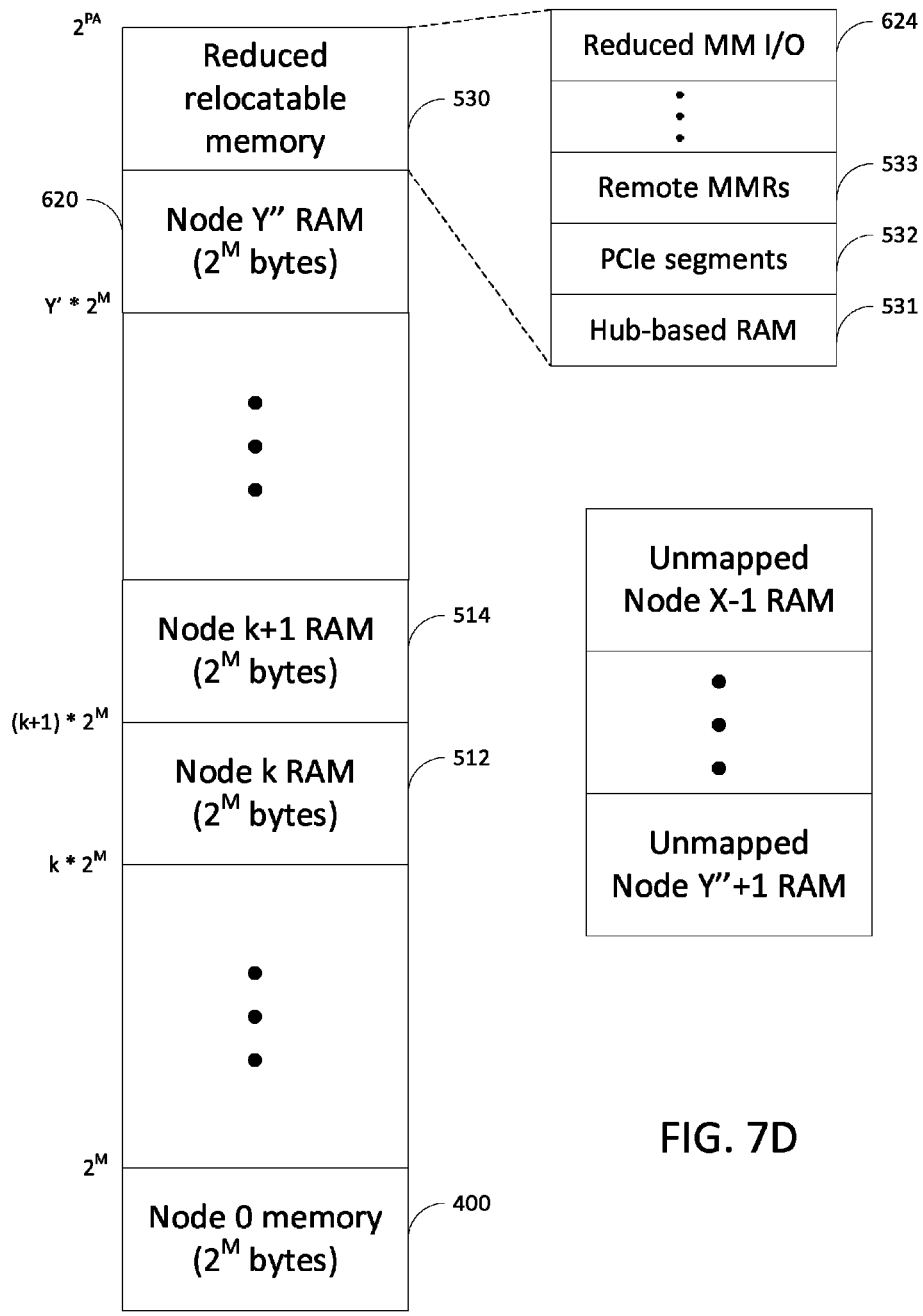
FIG. 7D shows the memory layout of FIG. 6, corrected according to a fourth embodiment of the invention by partially reducing the amount of mapped relocatable memory in I/O nodes.

FIG. 7D shows the memory layout of FIG. 6, corrected according to a fourth embodiment of the invention by partially reducing the amount of mapped relocatable memory 624 in I/O nodes; that is, by reducing $M_{IO}$. This can be accomplished by mapping, for at least the largest I/O node, less than the amount of memory that its I/O devices have requested. Because I/O devices often request a power of two number of bytes to be memory mapped, reducing $M_{IO}$ in this case often halves the amount of mapped memory available to the largest I/O device. In this configuration, the system will boot, but the full functionality of the I/O devices will be reduced. However, this configuration is useful to minimally boot the system and probe all of the nodes to discover I/O devices. As before, there is a new highest mapped node Y", whose memory is shown as block 620.

All of the corrections shown in FIGS. 7A-7D lose some amount of memory, however some types of memory are more useful than others, and there may be common priorities when choosing which memory to sacrifice. It might be the case that the most important issue to an HPC system operator is keeping as many nodes available for computation as possible. If an entire node's memory is lost, then all of its computing resources (e.g. CPUs) are lost as well. The first priority therefore may be mapping as many nodes as possible, even if those nodes are not entirely functional.

With respect to reduced functionality, some nodes are I/O nodes and some are not. I/O nodes contribute their memory-mapped I/O devices to the size of R, while non-I/O nodes do not. Moreover, because the principal scarce resource being optimized is address bits, it is more efficient to use fewer bits to address I/O nodes generally. If I/O devices can be moved to nodes with smaller node ID numbers, then it is possible to reduce the number of bits used to address I/O devices (i.e. reduce $N_{IO}$), and hence reduce the size of R. In any event, it is generally better to map at least some I/O memory from these nodes, because doing so allows the BIOS to identify the devices during boot. The second priority therefore may be providing at least some memory-mapped I/O space to all nodes that request it.

If all I/O devices are installed in their optimal nodes, it may be possible to provide the devices with some, but not all, of the memory they would like to have mapped. That is, it may be possible to reduce $M_{IO}$ (and hence reduce R) enough to squeeze more nodes into the memory map, at the cost of reduced I/O functionality in some or all of the I/O nodes. To the extent that mapping more of this memory is better, a third priority may be providing as much memory-mapped I/O address space as possible.

It is possible that several combinations of parameters might map all of the nodes and all of the I/O memory requested, but some may map more of the overall RAM than others. A fourth priority therefore may be to map all of the RAM in the partition if possible.

Figure 8:
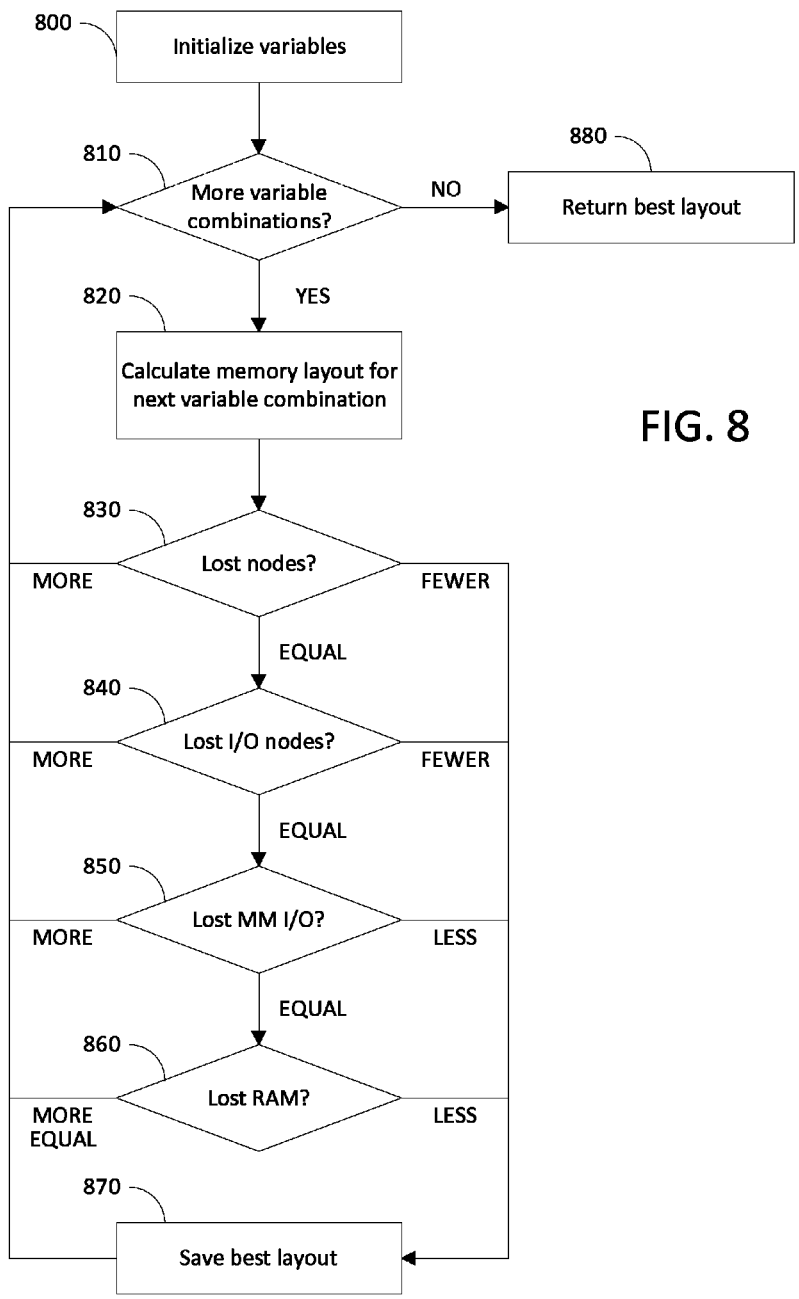
FIG. 8 shows a flowchart of a method for laying out memory in an HPC system according to an embodiment of the invention.

These four priorities are captured in the flowchart of FIG. 8, which shows a method for automatically laying out memory in an HPC system 100 according to an embodiment of the invention. In a first process 800, the variables are initialized. For example, a system-wide (or partition-wide) value of M is first determined, and upper and lower possible values for the variables M, N, $M_{IO}$ and $N_{IO}$ are determined. In process 810, the logic determines whether there are other combinations of these variables that have not been tried. If so, then in process 820, a memory layout is calculated for the next combination of variables. That is, given the values M, N, $M_{IO}$ and $N_{IO}$, the logic creates a tentative memory layout in accordance with the patterns and tradeoffs described above in connection with FIGS. 5-7.

The tentative memory layout may have completely omitted some number of nodes. In process 830, the number of lost (i.e., unmapped) nodes is compared to the best known so far. If the number is higher, then the tentative memory layout is worse than the saved layout, and the method returns to process 810. If the number is less, then the tentative memory layout is better than the saved layout, and the method continues to process 870 in which the variables M, N, $M_{IO}$ and $N_{IO}$ are saved. If, however, the number of unmapped nodes in the tentative layout is equal to the best found so far, then the method continues to process 840 to break the tie.

Although it may have mapped the largest number of nodes, the tentative memory layout may have completely omitted the I/O memory of some nodes having I/O devices. In process 840, the number of lost I/O nodes (i.e., those I/O nodes whose I/O memory is not mapped) is compared to the best known so far. If the number is higher, then the tentative memory layout is worse than the saved layout, and the method returns to process 810. If the number is less, then the tentative memory layout is better than the saved layout, and the method continues to process 870 in which the variables M, N, $M_{IO}$ and $N_{IO}$ are saved. If, however, the number of lost I/O nodes in the tentative layout is equal to the best found so far, then the method continues to process 850.

Although it may have mapped the largest number of nodes and the largest number of I/O nodes, the tentative memory layout may have mapped some, but not all, of the I/O memory, leading to reduced functionality of the I/O nodes. In process 850, the amount of lost memory-mapped I/O address space is compared to the best known so far. If the lost address space is higher, then the tentative memory layout is worse than the saved layout, and the method returns to process 810. If the lost address space is less, then the tentative memory layout is better than the saved layout, and the method continues to process 870 in which the variables M, N, $M_{IO}$ and $N_{IO}$ are saved. If, however, the amount of lost memory-mapped I/O address space in the tentative layout is equal to the best found so far, then the method continues to process 860.

Although it may have mapped the largest number of nodes, the largest number of I/O nodes, and the most I/O memory, the tentative memory layout may have mapped less RAM than other configurations. In process 860, the quantity of lost RAM is compared to the best known so far. If the tentative lost RAM is higher, then the tentative memory layout is worse than the saved layout, and the method returns to process 810. If the tentative lost RAM is less, then the tentative memory layout is better than the saved layout, and the method continues to process 870 in which the variables M, N, $M_{IO}$ and $N_{IO}$ are saved. If the number is equal, then there are two identical optimal solutions. However, by judicious choice of the order in which the variable combinations are visited, an earlier determined layout may be more advantageous than a later determined layout. Therefore, in FIG. 8, the later determined layout is discarded.

It should be noted that the order in which the combinations are visited may have other beneficial effects. For example, by choosing a value for N first (in increasing order), then a value for $N_{IO}$ (in decreasing order), then a value for $M_{IO}$ (also in decreasing order), the optimal solution will have the smallest overall physical address size and the largest amount of memory-mapped I/O space. This provides the smallest page table sizes in the operating system, and the ability to add the largest number of PCIe devices.

Although FIG. 8 shows one exemplary method of automatically determining which memory to map and which to discard, it is based on various priorities having a certain order to them. A person skilled in the art should recognize that other orderings of the priorities may be made, and how to implement a method that is modified to take into account the different orderings. Moreover, while the priorities illustrated in FIG. 8 include number of nodes lost, the number of I/O nodes lost, the amount of I/O memory lost, and the amount of RAM lost, the skilled artisan should recognize that other priorities may be used to determine a memory map. It should also be appreciated that in some embodiments of the invention, an HPC system operator may override the automatically determined best memory layout.

Although the above discussion discloses various exemplary embodiments of the invention, it should be apparent that those skilled in the art can make various modifications that will achieve some of the advantages of the invention without departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, Javascript, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A computer system having hardware-based non-uniform memory access, the computer system comprising a plurality of nodes, each node having a volatile memory and at least one computing processor, each computing processor being capable of addressing a maximum amount of volatile memory that is less than the collective amount of volatile memory in the plurality of nodes, wherein at least one node also includes an I/O device having I/O memory, each node being configured to calculate a memory layout that includes a portion of the volatile memory of each of a plurality of nodes in the computer system, the memory layout being calculated to minimize an amount of unmapped memory as a function of 1) the number of nodes in the computer system, 2) the amount of volatile memory in each node, 3) the number of nodes that include an I/O device having I/O memory, and 4) the amount of I/O memory in each such I/O device, wherein the computing processor of each node is further configured to access the memory of another node using the calculated memory layout.

2. The computer system of claim 1, wherein the maximum amount of volatile memory is at least 16 terabytes.

3. The computer system of claim 1, wherein the I/O device includes a network card, a graphics card, a non-volatile storage device, a coprocessor, or an accelerator card.

4. The computer system of claim 1, wherein calculating the memory layout comprises minimizing the number of unmapped nodes.

5. The computer system of claim 4, wherein calculating the memory layout further comprises minimizing the number of unmapped nodes that include an I/O device after minimizing the number of unmapped nodes.

6. The computer system of claim 5, wherein calculating the memory layout further comprises maximizing the amount of mapped I/O memory after minimizing the number of unmapped nodes that include an I/O device.

7. The computer system of claim 6, wherein calculating the memory layout further comprises maximizing the amount of mapped volatile memory after maximizing the amount of mapped I/O memory.

8. A method of operating a computer system having hardware-based non-uniform memory access, the computer system having a plurality of nodes, each node having a volatile memory and at least one computing processor, each computing processor being capable of addressing a maximum amount of volatile memory that is less than the collective amount of volatile memory in the plurality of nodes, wherein at least one node also includes an I/O device having I/O memory, the method comprising:

in each node of the computer system, calculating a memory layout that includes a portion of the volatile memory of each of a plurality of nodes in the computer system, the memory layout being calculated to minimize an amount of unmapped memory as a function of 1) the number of nodes in the computer system, 2) the amount of volatile memory in each node, 3) the number of nodes that include an I/O device having I/O memory, and 4) the amount of I/O memory in each such I/O device; and accessing, by a computing processor in a first node of the computer system, the memory of a second node of the computer system using the calculated memory layout.

9. The method of claim 8, wherein the maximum amount of volatile memory is at least 16 terabytes.

10. The method of claim 8, wherein the I/O device includes a network card, a graphics card, a non-volatile storage device, a coprocessor, or an accelerator card.

11. The method of claim 8, wherein calculating the memory layout comprises minimizing the number of unmapped nodes.

12. The method of claim 10, wherein calculating the memory layout further comprises minimizing the number of unmapped nodes that include an I/O device after minimizing the number of unmapped nodes.

13. The method of claim 12, wherein calculating the memory layout further comprises maximizing the amount of mapped I/O memory after minimizing the number of unmapped nodes that include an I/O device.

14. The method of claim 13, wherein calculating the memory layout further comprises maximizing the amount of mapped volatile memory after maximizing the amount of mapped I/O memory.

15. A computer program product for operating a computer system having hardware-based non-uniform memory access, the computer system having a plurality of nodes, each node having a volatile memory and at least one computing processor, each computing processor being capable of addressing a maximum amount of volatile memory that is less than the collective amount of volatile memory in the plurality of nodes, wherein at least one node also includes an I/O device having I/O memory, the computer program product comprising a non-transitory, tangible computer-readable storage medium on which is stored non-transitory program code for:

instructing each node of the computer system to calculate a memory layout that includes a portion of the volatile memory of each of a plurality of nodes in the computer system, the memory layout being calculated to minimize an amount of unmapped memory as a function of 1) the number of nodes in the computer system, 2) the amount of volatile memory in each node, 3) the number of nodes that include an I/O device having I/O memory, and 4) the amount of I/O memory in each such I/O device; and instructing a computing processor in a first node of the computer system to access the memory of a second node of the computer system using the calculated memory layout.

16. The product of claim 15, wherein the maximum amount of volatile memory is at least 16 terabytes.

17. The product of claim 15, wherein the I/O device includes a network card, a graphics card, a non-volatile storage device, a coprocessor, or an accelerator card.

18. The product of claim 15, wherein the program code for calculating the memory layout comprises program code for minimizing the number of unmapped nodes.

19. The product of claim 18, wherein the program code for calculating the memory layout further comprises program code for minimizing the number of unmapped nodes that include an I/O device after minimizing the number of unmapped nodes.

20. The product of claim 19, wherein the program code for calculating the memory layout further comprises program code for maximizing the amount of mapped I/O memory after minimizing the number of unmapped nodes that include an I/O device.

21. The product of claim 20, wherein the program code for calculating the memory layout further comprises program code for maximizing the amount of mapped volatile memory after maximizing the amount of mapped I/O memory.

\* \* \* \* \*